(12) United States Patent
Cun (10) Patent No.: US 10,552,923 B2
(45) Date of Patent: Feb. 4, 2020

(54) ELECTRIC VEHICLE CHARGING CONTROL SYSTEM

(71) Applicant: HONDA MOTOR CO., LTD., Tokyo (JP)

(72) Inventor: David Cun, Torrance, CA (US)

(73) Assignee: Honda Motor Co., Ltd., Tokyo (JP)

(*) Notice: Subject to any disclaimer, the term of this patent is extended or adjusted under 35 U.S.C. 154(b) by 9 days.

(21) Appl. No.: 14/273,325

(22) Filed: May 8, 2014

(65) Prior Publication Data
US 2015/0321570 A1 Nov. 12, 2015

(51) Int. Cl.
*G06Q 50/06* (2012.01)
*G06Q 30/04* (2012.01)
*G06Q 10/06* (2012.01)
*G06Q 20/08* (2012.01)
*G06Q 20/12* (2012.01)

(52) U.S. Cl.
CPC ....... *G06Q 50/06* (2013.01); *G06Q 10/06312* (2013.01); *G06Q 20/085* (2013.01); *G06Q 20/127* (2013.01); *G06Q 30/04* (2013.01)

(58) Field of Classification Search
CPC .......... G06Q 10/06312; G06Q 20/085; G06Q 20/127
See application file for complete search history.

(56) References Cited

U.S. PATENT DOCUMENTS

| 5,623,194 | A  | * | 4/1997  | Boll .................... B60L 11/1816 320/137 |
| 7,370,013 | B1 | * | 5/2008  | Aziz ..................... G06F 9/5072 705/40 |
| 7,679,336 | B2 |   | 3/2010  | Gale et al. |
| 8,125,183 | B2 | * | 2/2012  | Katsunaga .......... B60L 11/1816 320/104 |
| 8,344,686 | B2 |   | 1/2013  | Gaul et al. |
| 8,359,132 | B2 |   | 1/2013  | Laberteaux et al. |
| 8,422,654 | B1 | * | 4/2013  | Lee ........................ H04M 3/56 370/261 |
| 8,498,886 | B2 |   | 7/2013  | Epstein et al. |
| 8,564,454 | B2 |   | 10/2013 | Oizumi et al. |
| 8,604,750 | B2 |   | 12/2013 | Turner et al. |
| 8,717,170 | B1 | * | 5/2014  | Juhasz ................ B60L 11/1838 320/109 |
| 2005/0104555 | A1 | * | 5/2005 | Simmonds-Short ........................ H02J 7/0044 320/107 |

(Continued)

FOREIGN PATENT DOCUMENTS

| DE | 4344368 C1 | 5/1995 |
| EP | 2141043 A1 | 1/2010 |
| WO | 2008132947 A1 | 11/2008 |

*Primary Examiner* — Peter Ludwig
(74) *Attorney, Agent, or Firm* — Armstrong Teasdale LLP (57) ABSTRACT

An electric vehicle charging control system includes a battery for operating the electric vehicle that is charged by a charging connection to a charging station. A user interface is associated with the electric vehicle and includes a display and a user input device. A communication system communicates with the charging station. The communication system receives a congestion signal from the charging station when a second electric vehicle is waiting for charging by the charging station. After the congestion signal is received, the user interface prompts an operator of the electric vehicle that the second electric vehicle is waiting for charging by the charging station.

19 Claims, 2 Drawing Sheets

(56) References Cited

U.S. PATENT DOCUMENTS

| | | | |
|---|---|---|---|
| 2007/0064904 A1* | 3/2007 | Wesley | H04W 84/022 379/207.02 |
| 2008/0203973 A1* | 8/2008 | Gale | B60L 11/1816 320/157 |
| 2009/0021218 A1* | 1/2009 | Kelty | B60L 3/0092 320/137 |
| 2009/0082957 A1* | 3/2009 | Agassi | B60L 3/12 701/532 |
| 2009/0091291 A1* | 4/2009 | Woody | B60K 6/48 320/109 |
| 2009/0313033 A1* | 12/2009 | Hafner | B60L 8/003 705/1.1 |
| 2010/0019718 A1* | 1/2010 | Salasoo | B60L 3/0046 320/103 |
| 2011/0109266 A1* | 5/2011 | Rossi | B60L 11/1824 320/109 |
| 2011/0121790 A1* | 5/2011 | Brandon, II | H02J 7/0003 320/160 |
| 2011/0175569 A1* | 7/2011 | Austin | B60L 11/1824 320/109 |
| 2011/0193522 A1* | 8/2011 | Uesugi | B60L 1/003 320/109 |
| 2011/0288765 A1* | 11/2011 | Conway | G01C 21/3469 701/533 |
| 2011/0313603 A1* | 12/2011 | Laberteaux | B60L 11/184 701/22 |
| 2012/0056583 A1 | 3/2012 | Götz | |
| 2012/0098676 A1* | 4/2012 | Oizumi | B60L 11/1824 340/901 |
| 2012/0130775 A1* | 5/2012 | Bogaard | G07B 15/02 705/13 |
| 2012/0161702 A1 | 6/2012 | Kim | |
| 2012/0249065 A1* | 10/2012 | Bissonette | B60L 11/184 320/109 |
| 2012/0280653 A1* | 11/2012 | Prosser | H02J 7/00 320/109 |
| 2012/0319649 A1 | 12/2012 | Billmaier | |
| 2012/0330494 A1 | 12/2012 | Hendrix et al. | |
| 2013/0006677 A1* | 1/2013 | Anglin | G05F 5/00 705/5 |
| 2013/0046411 A1* | 2/2013 | Al Faruque | H02J 3/32 700/286 |
| 2013/0119920 A1* | 5/2013 | Hsu | B60L 11/1844 320/106 |
| 2013/0127417 A1 | 5/2013 | Karner et al. | |
| 2013/0162221 A1* | 6/2013 | Jefferies | B60L 11/1816 320/155 |
| 2013/0179061 A1* | 7/2013 | Gadh | B60L 11/1842 701/123 |
| 2013/0222158 A1* | 8/2013 | Dai | G06Q 50/30 340/995.13 |
| 2013/0231818 A1 | 9/2013 | Saito | |
| 2013/0257387 A1* | 10/2013 | Yokoyama | H02J 7/044 320/137 |
| 2013/0307475 A1* | 11/2013 | Kishiyama | H02J 7/0027 320/109 |
| 2013/0339072 A1 | 12/2013 | Touge | |
| 2014/0021908 A1* | 1/2014 | McCool | B60L 11/182 320/108 |
| 2014/0152254 A1* | 6/2014 | Juhasz | B60L 11/1844 320/109 |
| 2014/0203077 A1* | 7/2014 | Gadh | H02J 7/00 235/382 |
| 2014/0217976 A1* | 8/2014 | McGrath | B60L 11/1837 320/109 |

* cited by examiner

ELECTRIC VEHICLE CHARGING CONTROL SYSTEM

BACKGROUND

The present disclosure relates generally to battery electric vehicles (EVs), and to charging control systems for controlling charging of the battery at a charging station. Because electric vehicles (EVs) have only recently been introduced in mainstream market channels, electric vehicle charging infrastructure is limited. Direct current (DC) Fast Chargers are being developed to charge the EVs more quickly; however, due to the cost of such charging stations, their availability is limited. Typically, the DC Fast Chargers are only able to charge a single vehicle at a time. Additionally, due to the fast charging capability, such charging stations are popular. Congestion at such charging stations is a problem, particularly at peak times.

Moreover, because the charging infrastructure is a new and developing market, billing models for the charging stations have not been fully developed. In an effort to encourage a cleaner environment, some markets offer the charging for free. Other service providers have different billing models, such as a flat rate, a rate based on a quantity of electricity supplied, a rate based on a time the charger is connected to the EV, or some combination of the billing models. Each billing model has inefficiencies that lead to sub-optimal use of the charging infrastructure. For example, at the free charging stations, users are encouraged to over-use the charging station for a longer charge and more electricity than is needed, such as to arrive at the users next or final destination. Over-use leads to congestion at the charging station. Similarly, the flat fee billing model discourages unnecessary use, because the fee is charged irrespective of the amount of electricity used, but encourages over-use because the user wants to receive the most electricity per session. This over-use leads to congestion at the charging station. The charging per quantity of electricity encourages charging based on need, but as the charge rate becomes slow, such as when the battery becomes more charged, the user blocks access to the fast charging capabilities for other users. The charging based on time connected, encourages charging based on need and disconnecting when the charge rate slows; however charging to less than full capacity requires the EV to make more frequent stops at the charging station, which can lead to congestion. A need therefore exists for improved charging control systems that reduce the charging time of EVs at charging stations to reduce congestion at charging stations.

BRIEF DESCRIPTION

In one embodiment, an electric vehicle charging control system is provided that includes a battery for operating the electric vehicle that is charged by a charging connection to a charging station. A user interface is associated with the electric vehicle and includes a display and a user input device. A communication system communicates with the charging station. The communication system receives a congestion signal from the charging station when a second electric vehicle is waiting for charging by the charging station. After the congestion signal is received, the user interface prompts an operator of the electric vehicle that the second electric vehicle is waiting for charging by the charging station.

In another embodiment, an electric vehicle charging control system is provided that includes a battery for operating the electric vehicle that is charged by a charging connection to a charging station. A user interface is associated with the electric vehicle that has a display and a user input device. The system includes a controller for controlling charging of the electric vehicle and the controller receives a state of charge of the battery. A communication system communicates with the charging station without establishing the charging connection with the charging station. The communication system receives a billing signal from the charging station relating to a corresponding billing model used by the charging station. The controller calculates a charging cost based on the billing signal. After the billing signal is received, the controller determines a charging profile based on (i) the charging cost determined based on the billing signal, (ii) an operator desired charging time, and (iii) an operator desired post-charging battery state of charge. The charging profile is adjustable based on operator inputs to the user input device to change at least one of the charging time and the post-charging battery state of charge.

In a further embodiment, an electric vehicle charging control system is provided that includes a battery for operating the electric vehicle that is charged by a charging connection to a charging station. A user interface is associated with the electric vehicle. The user interface has a display and a user input device. The system includes a controller for controlling charging of the electric vehicle. The controller receives a state of charge of the battery. A communication system communicates with the charging station. The communication system receives at least one billing signal from the charging station relating to a corresponding at least one billing model used by the charging station. The controller calculates a full charging time based on the state of charge of the battery. The controller calculates a charging cost based on the at least one billing signal. The controller determines a quick charge profile having a reduced charging time less than a full charging time based on the charging cost.

DETAILED DESCRIPTION

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., systems, devices, processors, controllers, or memories) may be implemented in a single piece of hardware (e.g., a general purpose signal processor or random access memory, hard disk, or the like) or multiple pieces of hardware.

Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "module", "system," or "unit," may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules, units, or systems shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of methods and systems for charging electric vehicles are provided. It should be noted that although the various embodiments are described in connection with the automotive industry, such as for an automobile, one or more embodiments may be implemented in different industries and for different applications. Additionally, communication of information used in accordance with one or more embodiments may be performed with different types of communication protocols, as well as using different types of communication lines and communication buses.

One or more embodiments include a controller, implemented as a programmable logic controller (PLC), also referred to as a programmable logic circuit, that monitors, receives and/or transmits one or more operating characteristics or parameters of an electric vehicle, a charging station and/or a charging network. In some embodiments, the operating characteristics or parameters include at least one of a state of charge of a battery of the electric vehicle, an electric vehicle location or heading, a desired destination of the electric vehicle, charging station data, a charging time allowed, a charging billing model, and the like. In some embodiments, the controller is programmed to (i) store different charging or operational data, (ii) determine a state of charge of the battery of the electric vehicle, (iii) determine a charging time, (iv) determine a charge rate, and/or (v) reduce a charging completion time, such as to reduce congestion at public charging stations.

Figure 1:
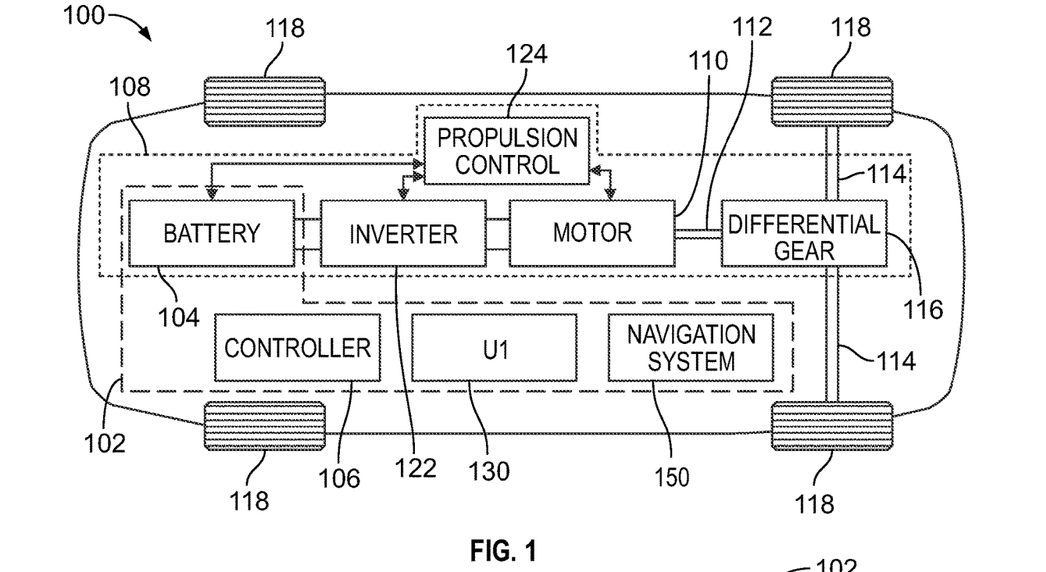
FIG. 1 illustrates an electric vehicle (EV) that includes an exemplary charging control system in accordance with one or more aspects of the disclosure.

FIG. 1 illustrates an electric vehicle (EV) 100, which includes an exemplary charging control system 102 in accordance with one or more aspects of the disclosure. The EV 100 may be a battery powered electric vehicle. The charging control system 102 is used to charge a battery 104 of the EV 100. The charging control system 102 may communicate with the operator, with a charging station and/or a central charging network or with other systems to control charging of the battery 104 of the EV 100. The EV 100 includes a controller 106 that may be used to control the charging control system 102.

The charging control system 102 may be operated to reduce charging times for charging the EV 100. The charging control system 102 may be operated to reduce congestion at public charging stations by reducing a charging time of the EV 100 that is connected to the charging station. The charging control system 102 may be operated to reduce the charging time and finish charging sooner when a congestion situation is detected at the charging station.

The charging control system 102 obtains a state of charge (SOC) signal or value from the battery 104 or from a controller associated therewith, such as the controller 106, and may control charging of the battery 104 based on the SOC, in addition to other parameters.

The EV 100 includes a propulsion system 108 having an electric motor 110 with a shaft 112, a drive axle 114 and a differential gear 116 for propelling the EV 100 via wheels 118. The propulsion system 108 further includes the battery 104, which provides DC current to an inverter 122, which in turn provides AC current to the motor 110 coupled by output shaft 112 with the axle 114 via the differential gear 116. The electric motor 110 drives the shaft 112 to transfer motive power to the differential gear 116, which transmits the motive power to the wheels 118, such as the front wheels and/or the rear wheels, by the axle 114 to propel the EV 100. One or more additional gears (not shown) may be included.

The battery 104 can be any suitable single or multiple battery configuration to supply power to the motor 110, for example, a nickel metal hydride, lithium ion, or similar battery. DC-DC boost circuitry such as a DC-DC converter (not shown) may be included to adjust the DC output of the battery 104 to any level suitable for providing an input to the inverter 122. The inverter 122 receives the DC power directly or indirectly from the battery 104 and converts it to AC voltage to control the drive motor 110 to drive the wheels 118. Optionally, the drive system may include one or more alternative charging means for charging the battery 104, for example, where the motor 110 may operate as a generator during vehicle braking to convert rotational energy from the wheels 118 into electrical energy, with the inverter 122 or other circuitry converting such power to DC current to charge the battery 104.

A propulsion controller 124 controls the inverter 122 according to driver inputs from an accelerator pedal sensor, a speed sensor, and/or a cruise control function or brake pedal sensor or other sensors (not shown) associated with the EV 100, and may include or be operatively coupled with a cruise control system (not shown). The propulsion controller 124 can be implemented as any suitable hardware, processor-executed software, processor-executed firmware, programmable logic, or combinations thereof, operative as any suitable controller or regulator by which the motor 110 and/or the inverter 122 can be controlled according to one or more desired operating values such as speed setpoint(s). The propulsion controller 124 may be integrated with the charging control system 102 or with other systems of the EV 100.

The propulsion controller 124, in certain embodiments, calculates an output that the driver requests via the accelerator pedal position sensor from a cruise control unit (not shown) and determines the vehicle speed from an output signal or value provided by the speed sensor. From these, the propulsion controller 124 determines a required driving power for controlling the inverter 122 and thus the motor 110, where the inverter control can include one or both of speed control and/or torque control, as well as other motor control techniques.

A user interface 130 is associated with the EV 100 and may be operably coupled to or part of the charging control system 102. The user interface 130 may be built-in to the EV 100, such as into a dashboard of the EV 100. In alternative embodiments, the user interface 130 may be an electronic device removable from the EV 100. For example, the user interface 130 may be a hand-held electronic device, such as a smart phone, that may be held and carried with the operator of the EV 100. The electronic device may be paired or otherwise connected to the EV 100. The electronic device may communicate with the EV 100, such as by wired or wireless communication.

Figure 2:
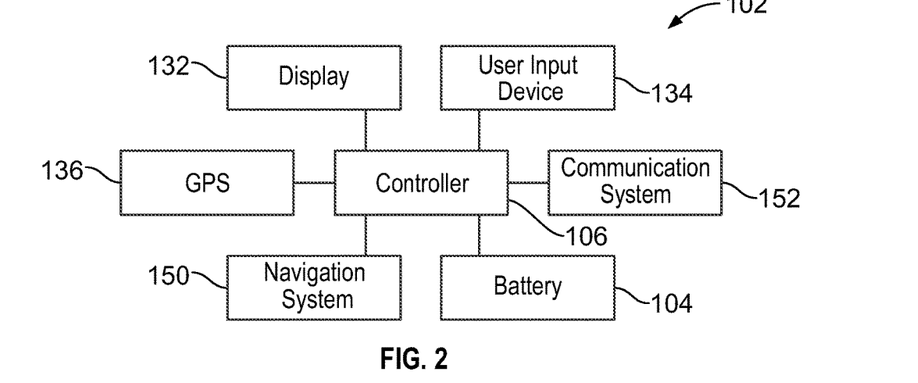
FIG. 2 illustrates an exemplary embodiment of a controller of the charging control system shown in FIG. 1.

FIG. 2 illustrates an exemplary embodiment of the controller 106 and its association with various other components and systems of the charging control system 102. The functional blocks illustrated in FIG. 2 are not necessarily indicative of the division between hardware circuitry. Thus, for example, one or more of the functional blocks may be implemented in a single piece of hardware or multiple pieces of hardware. The functionality of one or more of the components may be combined into a single component. The controller 106 can be implemented as any suitable hardware, processor-executed software, processor-executed firmware, programmable logic, or combinations thereof. The controller 106 may communicate with the battery 104, such as to receive information relating to the SOC of the battery 104, the temperature of the battery 104, and the like.

As noted above, the various embodiments of the controller 106 may be implemented in hardware, software or a combination thereof. The various embodiments and/or components, for example, the modules, or components therein, also may be implemented as part of one or more computers or processors. The computer or processor may include a computing device, an input device, a communication system, for example, for accessing a network and/or the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "system," "controller," "computer," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "controller," "module" or "computer."

The controller executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

The controller 106 may communicate with the user interface 130 before charging, during charging and after charging to allow interaction with the operator. For example, the charging control system 102 may provide an indication that charging is needed, such as when the battery SOC is below a certain threshold. The charging control system 102 may prompt the operator with various information associated with a particular charging station prior to, during and/or after charging at the charging station. The charging control system 102 may have default charging profiles to control charging. The charging profile may be updated or adjusted to reduce the charging time and congestion at the charging station. The charging control system 102 may have different default charging profiles or operate differently with different billing models of the charging station. For example, charging stations may have one or more of the following billing models available for charging the EV 100, such as a free billing model, a flat fee billing model, a bill-per-unit-energy billing model, a bill-per-unit-time billing model, or another billing model.

The user interface 130 has a display 132 and one or more user input devices 134. The user input devices 134 may be buttons, touch-screen display controls, voice activation features, and the like. Optionally, the user interface 130 may have audio output capability. The controller 106 and/or the charging control system 102 may receive inputs from the user interface 130, such as to control operation of the charging control system 102. The controller 106 and/or the charging control system 102 may transmit information to the user interface 130, such as for display on the display 132. For example, prompts may be provided at the display 132 relating to charging operation of the charging control system 102. The prompts may relate to selection of a charging profile, selection of available time allowed for charging, selection of a desired travel distance or range, selection of a charge rate (for example, fast charging, slow charging, charging at a particular electricity rate (kWh), and the like), selection of a charging cost, and the like.

The EV 100 includes an on-board global positioning system (GPS) 136 to ascertain the current vehicle position. The GPS 136 is operatively coupled with the controller 106, the user interface 130 and/or an on-board navigation unit or system 150 of the EV 100. The navigation system 150 is operatively coupled with the controller 106 and/or the user interface 130. The navigation system 150 generally operates according to user-entered destination and preferences information, and interfaces with the GPS 136. The navigation system 150 may receive inputs from one or more further sensors, such as a gyro sensor, and may communicates with the propulsion controller 124 (shown in FIG. 1), for instance, to obtain current vehicle speed information and status information regarding the inverter 122 and the motor 110. The navigation system 150 can be implemented as any suitable hardware, processor-executed software, processor-executed firmware, programmable logic, or combinations thereof, and may be integrated with the propulsion controller 124, with the charging control system 102 or with other systems of the EV 100.

The navigation system 150, in certain embodiments, provides information to the display 132, such as showing a map rendering or other depiction of the current vehicle position on a road map with instructions and graphics showing a vehicle route. The navigation system 150 may accept inputs from the operator via the user interface 130. The navigation system 150 may also obtain traffic information such as road congestion information, road condition information, charging station location information, charging station congestion information and other navigation information from external sources, for instance, via a communication system 152 of the EV 100. The communication system 152 may communicate with other systems or networks outside of the EV 100, such as a central server or network associated with the charging station(s). The communication system 152 may communicate via a telematic device or unit within the EV 100. The communication system 152 may communicate wirelessly, such as with a cellular network. In operation, the navigation system 150 can compute and utilize road congestion information for normal route selection and can provide graphical overlays on the user interface display 132 to indicate a congested area on road map data. The navigation system 150 may obtain charging station location information about various charging stations. The navigation system 150 and/or the charging control system 102 may obtain charging data about the various charging stations, such as charging costs, charge rates (e.g., charging speed), charging station availability, congestion information about the charging station, and the like, and such information may be presented to the operator on the display 132.

Figure 3:
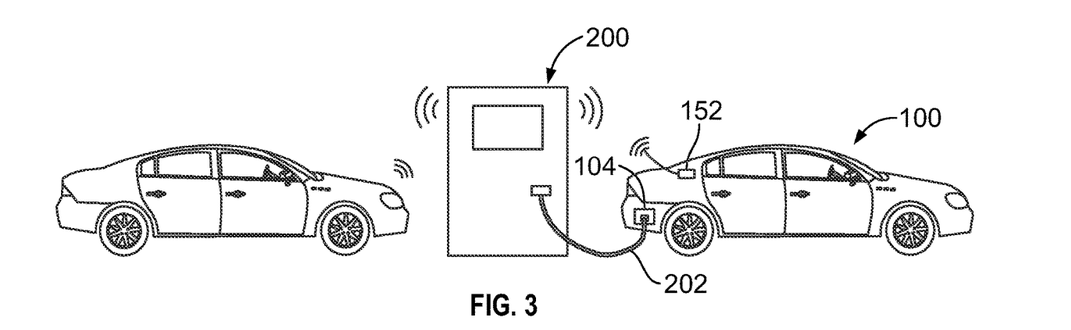
FIG. 3 illustrates the EV shown in FIG. 1 at a charging station.

FIG. 3 illustrates the EV 100 at a charging station 200. The EV 100 is electrically connected to the charging station 200 by a charger 202 to create a charging connection with the charging station 200. The charger 202 is plugged into, or mated, with the charging control system 102 of the EV 100. The charging station 200 supplies electricity to the battery 104 via the charger 202. In an exemplary embodiment, the charging station 200 is a fast charger, such as a DC Fast Charger that is capable of dispensing electricity at a high rate. The charging station 200 and/or the EV 100 may have features and control parameters that allow for reduced charging times to reduce congestion at the charging station 200. The charging station 200 may be communicatively coupled to a charging station database or network for interfacing with a server and possible with other charging stations. The EV 100 may be able to communicate with the charging station network or server to receive information about one or more of the charging stations.

The EV 100 may be paired with the charging station 200 to establish a communication link with the charging station 200. Optionally, the EV 100 may be paired with the charging station 200 by a wireless communication link. For example, the communication system 152 may establish communication either directly with the charging station 200 or with a central charging server or network that sends information about the particular charging station 200. The communication may be established by proximity of the EV 100 to the charging station 200. For example, the communication system 152 may establish an in-vicinity wireless communication link by establishing a personal area network. The wireless signals may be transmitted within a certain area. The wireless communication link may use short-wavelength radio waves, such as waves in the 2.4 to 2.485 GHz frequency bands commonly used for Bluetooth; however communication may be in other frequency bands in alternative embodiments. The charging station 200 may create a geographic perimeter or geo-fence around the charging station 200 and any EV within the geo-fence may establish communication with the charging station 200. In alternative embodiments, the EV 100 may be paired with the charging station 200 by a wired communication link, such as through the charger. Once the communication link is established, data may be transmitted between the EV 100 and the charging station 200.

The charging station 200 may have one or more billing models associated therewith. The operator of the EV may have to pay for the electricity used to charge the EV 100 according to the billing model used or selected. The charging station 200 may have a free billing model where the electricity may be supplied without fees. Such billing model may be available at certain times of day or to certain customers, such as customers that have a subscription service with the supplier of the electricity. The charging station 200 may have a flat fee billing model that charges a connection fee but does not charge based on the amount of electricity supplied or the time the charging connection is maintained. The charging station 200 may have a bill-per-unit-energy billing model that charges a fee for the quantity of electricity supplied (e.g., in terms of the electricity supplied in, for example, kWh). The charging station 200 may have a bill-per-unit-time billing model that charges a fee for every minute or second that the charging connection is maintained. The charging station 200 may have other billing models and some billing models may be a combination of the billing models listed above, such as a billing model that charges a connection fee and then a fee per quantity of electricity or a fee per time.

The charging station 200 sends one or more billing signals to the EV 100. The billing signals may correspond to the billing models being offered. The billing signals may relate to the charging cost, such as connection fee, cost per kWh, cost per minute, and the like. The charging station 200 may offer more than one billing model to the operator of the EV 100 and thus may send more than one billing signal to the EV 100. Information relating to the billing signal is processed by the controller 106 (shown in FIG. 2) and may be presented to the operator on the display 132 (shown in FIG. 2). The operator may make selections based on the information presented at the display 132, such as selecting from the various billing models offered.

Figure 4:
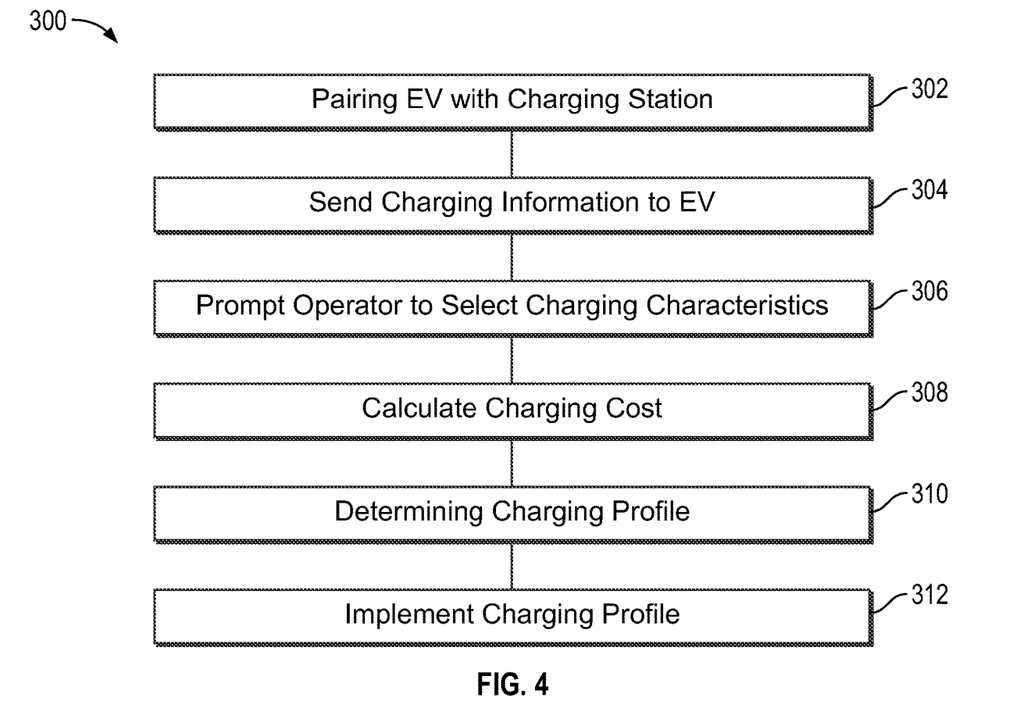
FIG. 4 is a flow chart showing an exemplary charging method for charging an EV, for example, the EV shown in FIG. 1.

FIG. 4 is a flow chart showing an exemplary charging method 300, such as for charging the EV 100. The method 300, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 300 may be able to be used as one or more algorithms to direct hardware to perform operations described herein. In various embodiments, certain steps may be performed by the EV 100 while other steps may be performed by the charging station 200 or by another system.

The method 300 includes pairing the EV 100 with the charging station 200 at 302. Communication between the EV 100 and the charging station 200 is able to occur when the EV 100 is paired with the charging station 200. In some embodiments, the EV 100 may be paired automatically when the EV 100 is in the vicinity of the charging station 200. For example, when the EV 100 is parked at or near the charging station 200, such as within a range of the charger 202, the EV 100 may be automatically paired with the charging station 200. The EV 100 may be paired with the charging station 200 as the EV 100 is being driven toward the charging station 200, such as on the same street or within the same block as the charging station 200. The EV 100 may be paired with the charging station 200 by using a telematic device of the EV 100 to communicate with the charging station 200 even when the EV 100 is remote from the charging station 200, such as by using the user interface 130 to select the charging station 200. Optionally, the EV 100 may remain paired with the charging station 200 even after leaving the charging station 200. For example, the controller 106 may store information about the charging station 200, which may be used by the EV 100 on successive trips to the same charging station 200. In some embodiments, the EV 100 may be paired with the charging station 200 by physically connecting the charging station 200 to the EV 100, such as by plugging the charger 202 into the EV 100.

Once the EV 100 and the charging station 200 are paired, the charging station 200 is able to send charging information to the EV 100 at 304. For example, billing signals may be sent to the EV 100. The billing signals may relate to one or more billing models offered by the charging station 200. The billing signals may relate to the charging cost, such as connection fee, cost per quantity of electricity (e.g., kWh), cost per minute, and the like. Optionally, the controller 106 may be able to accept different billing signals relating to different billing models. The controller 106 may process the billing signals differently to determine different charging profiles for the different acceptable billing signals. For example, if the charging cost is a flat fee, the controller 106 may determine that a longer charging cycle is better as such longer charging cycle will supply more electricity to the battery for the same flat fee. If the charging cost is a cost per quantity of electricity, the controller 106 may determine that an optimum cost per quantity may be achieved at a partial SOC. If the charging cost is a cost per minute, the controller 106 may determine that an optimum cost per quantity may be achieved at a partial SOC, such as when the charging rate begins to decrease as the battery 104 becomes full. Optionally, other types of signals may be sent from the charging station 200 to the EV 100. For example, congestion signals, which relate to other EVs using the charging station 200 or desiring to use the charging station 200, may be sent to the EV 100.

The controller 106 processes the charging information from the charging station 200. The controller 106 may prompt the operator, such as at the user interface 130, to select charging characteristics at 306, which may be based on the charging information from the charging station 200 and/or based on other charging information from the EV 100. For example, the user interface 130 may display one or more prompts on the display 132 that allow the operator to select charging characteristics to control the charging operation.

The controller 106 may receive battery data from the battery 104, such as the current SOC of the battery 104, the temperature of the battery 104, the health of the battery 104, and the like. The controller 106 may use the battery data as charging information to determine an amount of charging needed for the EV 100. The controller 106 may receive destination data from the navigation system 150, such as a navigation system travel destination, which may have been previously input into the navigation system 150, default destinations, such as work, home, and the like that may have been previously input into the navigation system 150, or other types of destination data. The navigation system 150 and/or the user interface 130 may estimate the travel destination if not already input or selected by the navigation system, such as based on route history, the current heading, time of day, and the like. The controller 106 may use the destination data as charging information to determine an amount of charging needed for the EV 100. The controller 106 may receive time data as charging information to determine the amount of time allowed for charging. For example, the operator may enter a time allowed for charging, such as in X minutes or charging until XX:XX time. The operator may have a default time allowed for charging that is used by the controller 106.

Based on the charging information received by the controller 106, the user interface 130 prompts the operator with one or more prompt indicators on the display 132. The prompt indicator may be a selectable indicator. For example, the prompt indicator may be a sliding scale that may be adjusted by the user input device(s) 134. The prompt indicator may be one or more buttons, touch-screen display controls, voice activation features, and the like that allow the operator to select a charging characteristic.

The selectable charging characteristic may relate to a desired battery SOC. The user may select a charge level, such as 80% charge, full charge, optimized charge, default charge, and the like. The charging profile may be adjusted based on the selected desired battery SOC. Optionally, the user interface 130 may display the current SOC of the battery 104 and, when prompted, the operator may adjust the desired final or post-charging battery SOC using the user input device(s) 134.

The selectable charging characteristic may relate to a desired travel distance. The user may select a desired destination or the controller 106 may retrieve the desired destination from the navigation system 150. The charging profile may be adjusted based on the desired travel destination. For example, a greater charge level may be needed to reach further travel destinations. Optionally, the user interface 130 may display the travel range, which may be based on the current SOC of the battery 104, and, when prompted, the operator may adjust the desired travel range using the user input device(s) 134. By selecting a travel destination, the controller 106 may determine that less than a full charge may be needed to travel to the desired destination, and thus less than a full charging cycle may be implemented by the controller 106, which reduces the charging time and congestion at the charging station 200.

The selectable charging characteristic may relate to a time allowed for charging. Optionally, the user interface 130 may display the current time or a nominal zero time and, when prompted, the operator may adjust the desired completion time (e.g., in terms of actual completion time or number of minutes until completion) using the user input device(s) 134. By selecting a time allowed for charging that is less than a full charging cycle, the charging time is reduced and congestion at the charging station 200 is also reduced.

The controller 106 calculates a charging cost at 308. The controller 106 uses the billing signal to calculate the charging cost. The controller 106 may calculate the charging cost based on other factors, such as the user selectable charging characteristics. For example, as the operator adjusts the charging time allowed, the charging cost may be likewise adjusted, or as the operator adjusts the post-charging battery state of charge, the charging cost may likewise be adjusted, or as the operator adjusts the desired travel distance, the charging cost may likewise be adjusted. Optionally, the charging cost may be based on a charge rate allowed by the charging station 200. Optionally, the charging station 200 may have different charging rates. Optionally, the battery 104 may charge at different charge rates depending on the battery SOC. For example, as the battery 104 becomes fully charged, the charge rate may become slower. The charging cost may be associated with the charge rate and the controller 106 may factor in the charge rate in determining the charging cost. The user interface 130 may display the charging cost on the display 132. The displayed charging cost may be adjusted as the operator adjusts other charging characteristics.

The controller 106 determines a charging profile at 310, which may be based on the operator selected charging characteristics and/or the calculated charging cost. The controller 106 uses the charging cost and the selected charging characteristics to provide an intelligent charging profile that allows enough charging for the needed operation of the EV 100 while avoiding over-charging and thus over-use of the charging station 200, to reduce congestion at the charging stations 200. The charging profile may include a charging time. In an exemplary embodiment, the charging profile is a quick charging profile having a reduced charging time that is less than a full charging time required to achieve a 100% SOC. The quick charging profile allows the operator to leave the charging station 200 more quickly than a full charging time and reduces congestion at the charging station 200. The quick charge profile may be based on the charging cost and the user may elect to reduce the charging time, the post-charging SOC and/or the travel range by receiving less than a full charge to reduce the charging cost. The charger 202 may supply electricity for the determined charging time. The charging profile may include a charging rate. The charger 202 may supply electricity at the selected charging rate. The charging profile may include a charging level, which may correspond to a battery SOC. For example, the charger 202 may supply electricity to the battery 104 until the SOC is at a selected SOC level.

In an exemplary embodiment, the charging profile may be updatable during the charging cycle. For example, the operator may decide and/or the charging station 200 may require that charging is to end or cease early, which reduces the overall charging time. For example, based on a congestion condition, such as when a second EV is waiting for charging at the charging station 200, the operator may decide to end the charging cycle early. Optionally, as described in further detail below, the charging station 200 may communicate a congestion signal to the controller 106, which may prompt the operator that another EV is requesting use of the charging station 200. The user interface 130 may query the operator to determine if the operator would like to end the charging cycle early to allow the other EV to begin charging sooner, and thus reduce congestion at the charging station 200. The operator can either accept the request and complete charging sooner, or may ignore the request and continue charging in accordance with the charging profile.

The charging control system 102 implements the charging profile and/or the updated charging profile at 312 once approved by the operator. For example, after the operator selections have been made, the charging control system 102 is ready to begin the charging cycle. In an exemplary embodiment, when the communication between the EV 100 and the charging station 200 is wireless, all communication and user selection may be performed before the operator has even connected the charger 202 to the EV 100. In such cases, once the charging control system 102 is ready to implement the charging profile, the operator may exit the EV 100, activate the charger 202 and plug the charger 202 into the EV 100 and the charging cycle will begin. In another exemplary embodiment, when communication between the charging station 200 and the EV 100 is achieved through the connection of the charger 202 to the EV 100, the operator must first connect the charger 202 to the EV 100, return to the EV 100 to make the selections on the user interface 130 and then the charging cycle is able to begin. Optionally, rather than making the selections in a built-in user interface 130, the user interface 130 may be implemented in the operator's cell phone or other handheld electronic device. As such, the operator does not necessarily have to return to the EV to make the selections, but rather does so on the electronic device.

Figure 5:
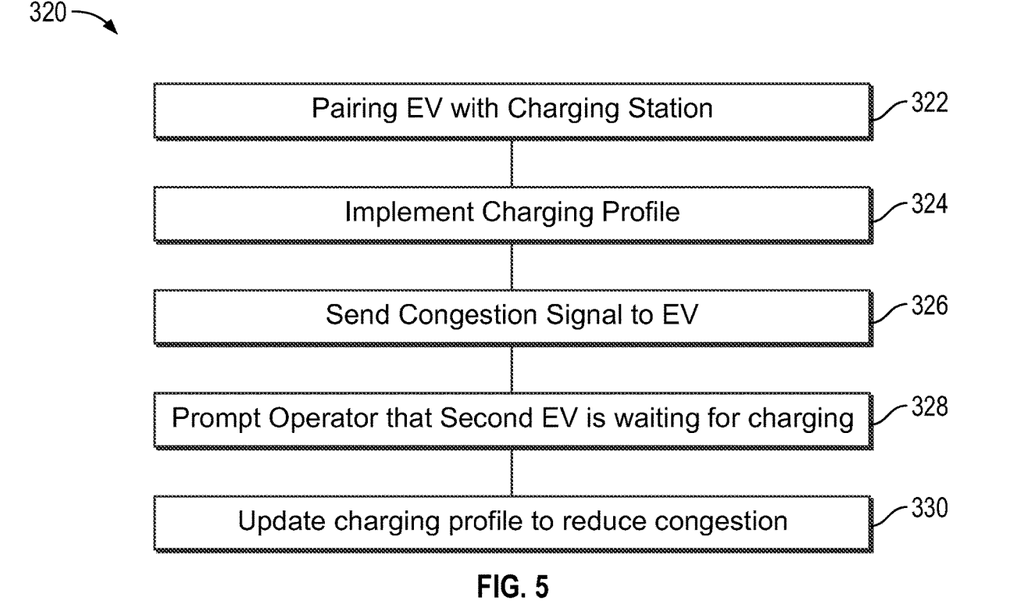
FIG. 5 is a flow chart showing an exemplary charging method that reduces the charging cycle time based on congestion at a charging station, for example, the charging station shown in FIG. 3.

FIG. 5 is a flow chart showing an exemplary charging method 320 that reduces the charging cycle time based on congestion at the charging station 200. The method 320 includes pairing the EV 100 with the charging station 200 at 322. Communication between the EV 100 and the charging station 200 is able to occur when the EV 100 is paired with the charging station. Once the EV 100 and the charging station 200 are paired, information is able to be exchanged between the charging station 200 and the EV 100. For example, billing signals may be sent to the EV 100.

In a similar manner as described above with reference to FIG. 4, the controller 106 may receive and process charging information from the charging station 200. The controller 106 may receive and process battery data from the battery 104, such as the current SOC of the battery 104. The controller 106 may receive and process destination data from the navigation system 150. The controller 106 may receive and process time data to determine the amount of time allowed for charging. Based on the information received by the controller 106, the user interface 130 may prompt the operator with one or more prompt indicators on the display 132. The controller 106 determines a charging profile, which may be based on the user selected charging characteristics and/or the calculated charging cost.

The charging control system 102 implements the charging profile at 324. For example, after operator selections have been made, the charging control system 102 begins the charging cycle.

During the charging cycle, a second EV may arrive at the charging station 200 and desire charging. The charging station 200 receives an indication from the second EV, for example, the charging station 200 may be paired with the second EV when the second EV is in the charging station geo-fence. The charging station 200 sends a congestion signal to the EV 100 at 326 indicating to the first EV 100 that a second EV is waiting for charging by the charging station 200. The controller 106 processes the congestion signal and prompts the operator of the EV 100 at 328 that the second EV is waiting for charging. The congestion prompt may be a prompt indicator on the display 132. The prompt indicator may be a selectable indicator allowing the operator to select if the operator of the first EV 100 would like to allow early cessation of charging to allow the second EV to start charging sooner. For example, the prompt indicator may be a question such as "Would you like to end charging early to allow another EV to begin charging?" with selectable boxes, such as "yes" and "no", presented that are selectable by the operator. If the operator selects "yes" then the charging profile may be updated. For example, the charging completion time may be advanced to cease charging sooner. The charging profile may be updated based on a required SOC of the battery. For example, if the EV requires a SOC of 54% to reach the next destination (e.g., home), but the current SOC is at 43%, then the charging cycle will continue until the SOC is at least 54%, even though the original charging profile would have charged the battery 104 to 80% if no congestion signal was received. The charging control system 102 may update the charging cycle at 330 based on other factors in alternative embodiments after the congestion signal is received.

In an exemplary embodiment, the user interface 130 displays charging information on the display 132 when the user interface 130 prompts the operator. For example, the user interface 130 may display the current battery SOC, the remaining charging time to complete charging in accordance with the original charging profile, a travel range based on the current battery SOC, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

The foregoing description of embodiments and examples has been presented for purposes of illustration and description. It is not intended to be exhaustive or limiting to the forms described. Numerous modifications are possible in light of the above teachings. Some of those modifications have been discussed and other will be understood by those skilled in the art. The embodiments were chosen and described for illustration of various embodiments. The scope is, or course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. An electric vehicle charging control system comprising:
   a battery for operating the electric vehicle, the battery configured to be charged by a charging connection to a charging station;
   a user interface associated with the electric vehicle, the user interface having a display and a user input device;
   a controller for controlling charging of the electric vehicle, the controller receiving a state of charge of the battery;
   a communication system communicating with the charging station without establishing the charging connection with the charging station, the communication system receiving charging information from the charging station relating to a type of billing model used by the charging station, wherein the type of billing model is one of a plurality of different types of billing models;
   wherein the controller determines the type of billing model used by the charging station based on the charging information, the controller configured to receive different types of charging information associated with the plurality of different types of billing models; and
   wherein, after the charging information is received, the controller determines a charging profile based on the determined type of billing model used by the charging station, the controller configured to determine a different charging profile for each of the plurality of different types of billing models, the charging profile being adjustable based on operator inputs to the user input device to change at least one of an operator desired charging time and an operator desired post-charging battery state of charge, wherein the controller controls charging of the battery according to the charging profile;
   wherein the electric vehicle is a first electric vehicle, and wherein the communication system receives a congestion signal from the charging station when a second electric vehicle is waiting for charging by the charging station while the first electric vehicle is connected to the charging station by the charging connection, the user interface prompting an operator of the first electric vehicle that the second electric vehicle is waiting for charging by the charging station after the congestion signal is received.

2. The electric vehicle charging control system of claim 1, wherein the communication system establishes in-vicinity wireless communication with the charging station.

3. The electric vehicle charging control system of claim 1, wherein the communication system establishes communication with the charging station based on a global positioning system of the electric vehicle.

4. The electric vehicle charging control system of claim 1, wherein the charging information comprises a billing rate.

5. The electric vehicle charging control system of claim 1, wherein the controller is further configured to calculate a charging cost based on the charging information and at least one of the operator desired charging time and the operator desired post-charging battery state of charge, wherein the controller updates the charging cost as the operator adjusts at least one of the charging time and the post-charging battery state of charge.

6. The electric vehicle charging control system of claim 1, wherein the controller determines the charging profile based on at least one of a charge rate of the charging station and an operator desired travel distance.

7. The electric vehicle charging control system of claim 6, wherein the controller determines the operator desired travel distance based on a navigation system signal of the electric vehicle.

8. The electric vehicle charging control system of claim 1, wherein the charging connection with the charging station is established after the charging profile is determined by the controller.

9. The electric vehicle charging control system of claim 1, wherein the user interface prompts the operator with a prompt indicator on the display.

10. The electric vehicle charging control system of claim 9, wherein the prompt indicator is a selectable indicator allowing early cessation of charging.

11. The electric vehicle charging control system of claim 10, wherein the user input device allows the operator to either accept or deny early cessation of charging.

12. The electric vehicle charging control system of claim 1, wherein the charging profile includes a charging rate defining a rate at which electricity is to be supplied to the electric vehicle from the charging station, the controller configured to determine the charging rate based on the at least one operator desired charging time and operator desired post-charging battery state.

13. The electric vehicle charging control system of claim 1, wherein the charging profile includes a charging level corresponding to a battery state of charge at which charging of the electric vehicle is to be terminated.

14. The electric vehicle charging control system of claim 1, wherein the plurality of different types of billing models includes at least two billing models selected from the group consisting of a flat fee billing model, a bill-per-unit-energy billing model, a bill-per-unit-time billing model, and a free billing model.

15. The electric vehicle charging control system of claim 1, wherein the plurality of different types of billing models includes a flat fee billing model and a bill-per-unit-time billing model.

16. The electric vehicle charging control system of claim 1, wherein the controller is configured to determine the charging profile based on a bill-per-unit-energy billing model and a bill-per-unit-time billing model, the charging profile determined by the controller for the bill-per-unit-time billing model being based on a decrease in charging rate as the battery approaches a maximum state of charge.

17. The electric vehicle charging control system of claim 1, wherein the controller is configured to determine a different charging profile for each of a bill-per-unit-energy billing model and a bill-per-unit-time billing model, the charging profile determined by the controller for the bill-per-unit-energy billing model being based on an operator desired travel distance.

18. The electric vehicle charging control system of claim 1, wherein the user interface is built into the electric vehicle.

19. The electric vehicle charging control system of claim 1, wherein the user interface is an electronic device removable from the electric vehicle.

* * * * *